Aug. 8, 1961     W. H. KLIEVER ET AL     2,995,725
HIGH SPEED SONAR SCANNING APPARATUS
Filed June 10, 1955     2 Sheets-Sheet 1

INVENTOR
WALDO H. KLIEVER
WAYNE M. ROSS
BY George W. Field
ATTORNEY

Aug. 8, 1961         W. H. KLIEVER ET AL         2,995,725
HIGH SPEED SONAR SCANNING APPARATUS
Filed June 10, 1955                              2 Sheets-Sheet 2 t = 0 t = 1/6 t = 1/3 t = 1/2 t = 2/3 t = 5/16 t = 1

INVENTOR
WALDO H. KLIEVER
WAYNE M. ROSS
BY George M. Field
ATTORNEY

United States Patent Office 2,995,725
Patented Aug. 8, 1961

2,995,725
HIGH SPEED SONAR SCANNING APPARATUS
Waldo H. Kliever, Cleveland, Ohio, and Wayne M. Ross, Seattle, Wash., assignors to Minneapolis-Honeywell Regulator Company, Minneapolis, Minn., a corporation of Delaware
Filed June 10, 1955, Ser. No. 514,564
9 Claims. (Cl. 340—3)

This invention relates to the field of underwater sound, and more particularly to search sonar for determining the location of subaqueous objects with respect to a vessel. A principal object of the invention is to provide means whereby the scanning rate of search sonar equipment may be increased without at the same time decreasing the working range of the equipment. Other objects are to provide search sonar apparatus using a plurality of transducers only one of which acts as a transmitter, to provide search sonar apparatus operative at a plurality of transducer frequencies, and to provide a novel recorder, having several recording units and a single pick-off unit, in which relative movement in opposite directions and at different rates takes place between the pickoff head and the recording units, respectively, and the recording medium, any one of which may be stationary.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which is illustrated and described a preferred embodiment of the invention. In the drawing:

In previous search sonar equipment it has been known to mount a transducer beneath a vessel for rotation about a vertical axis, and to energize the transducer with electrical pulses so that it emits a succession of pulses of supersonic energy, which are transmitted through the water. The radiation pattern of the transducer used is directional, so that each supersonic pulse "illuminates" a limited angular space. Any object in that space reflects the supersonic energy, which returns to the transducer at an interval after transmission which is determined by the distance between the vessel and the reflecting object. The echo pulses are amplified and used to operate a suitable indicator: a cathode ray type of indicator is found very satisfactory.

The speed of sound in water is about 4800 feet per second, the exact value depending on temperature, salinity, and other factors. Thus for a search sonar which is to have a maximum range of 1200 feet, the maximum round trip travel time for a pulse is ½ second, and the maximum pulse repetition rate is therefore 2 pulses per second.

Figure 2:
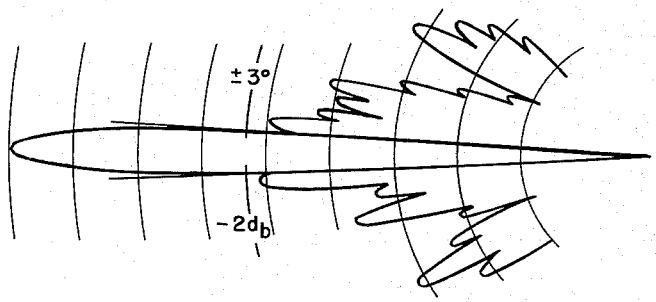
FIGURE 2 shows the energy distribution of a transducer output.
Figure 3:
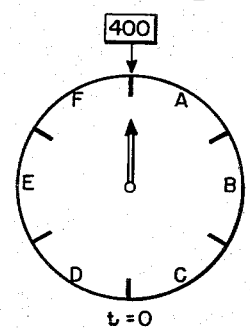
FIGURES 3–9 are illustrative of the operation of the recorder of FIGURE 1.
Figure 4:
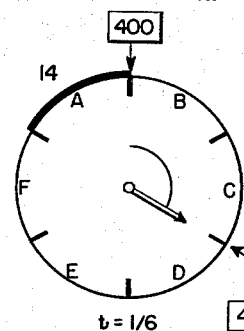
Figure 5:
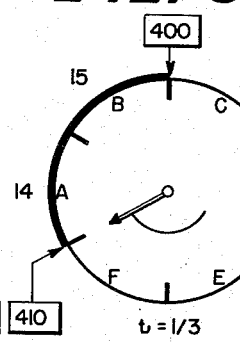
Figure 6:
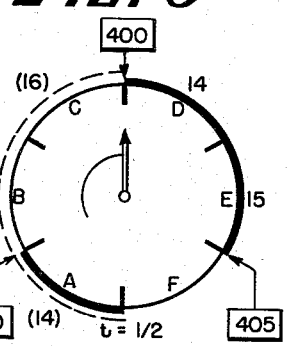
Figure 7:
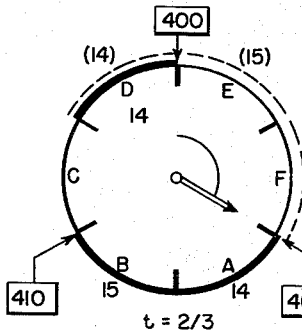
Figure 8:
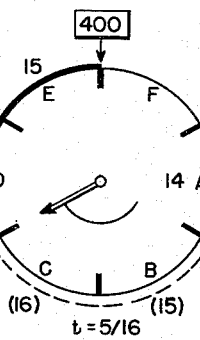
Figure 9:
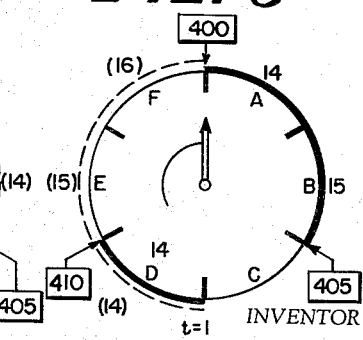

As mentioned above, the directivity patterns of typical transducers are directional, an illustrative pattern being shown in FIGURE 2. An arbitrary level of —2 db may be set as defining the beam angle of the transducer when used as a transmitter, and an angle of 6° is representative here. For simplicity in the analysis, only the center lobe is considered, which in practice is responsible for most of the observable returned signals. Accordingly, if every point on the circumference of a circle of 1200 feet radius is to receive energy once in each revolution of the transducer, the transmitter cannot rotate at a speed greater than 6° per pulse interval of ½ second, or two circular scans per minute. For safety the speed is generally reduced so that every point on the circumference receives at least 2 successive pulses, so that the effective beam angle is 3°, and the maximum scan rate is therefore 1 revolution per minute.

The present invention contemplates the use of more than one transducer and is shown in an embodiment having three transducers. Suppose the three transducers to have the same effective beam angle, namely 3°, and suppose them to be rotated as a unit at three times the speed just set forth, that is, at three scans per minute. By the time the first transducer has been rotated through 3° only echoes from objects up to 400 feet away have been received, but the second transducer now sweeps the same angular space and receives echoes from objects between 400 and 800 feet away. At the same time the first transducer has emitted and is ready to receive a second pulse of a different frequency in an adjacent 3° angular space, and the procedure is repeated.

The invention further comprises means for making use of the pulses received from the different transducers in a coherent manner, including a recorder for receiving the echo pulses and means for reading them off at 3 times the rate at which they are recorded, and an indicator for making the results of system operation usefully apparent to an observer.

For convenience in keeping the successive pulses separate they occur in a repeating succession of slightly different frequencies, as will now be explained.

Figure 1:
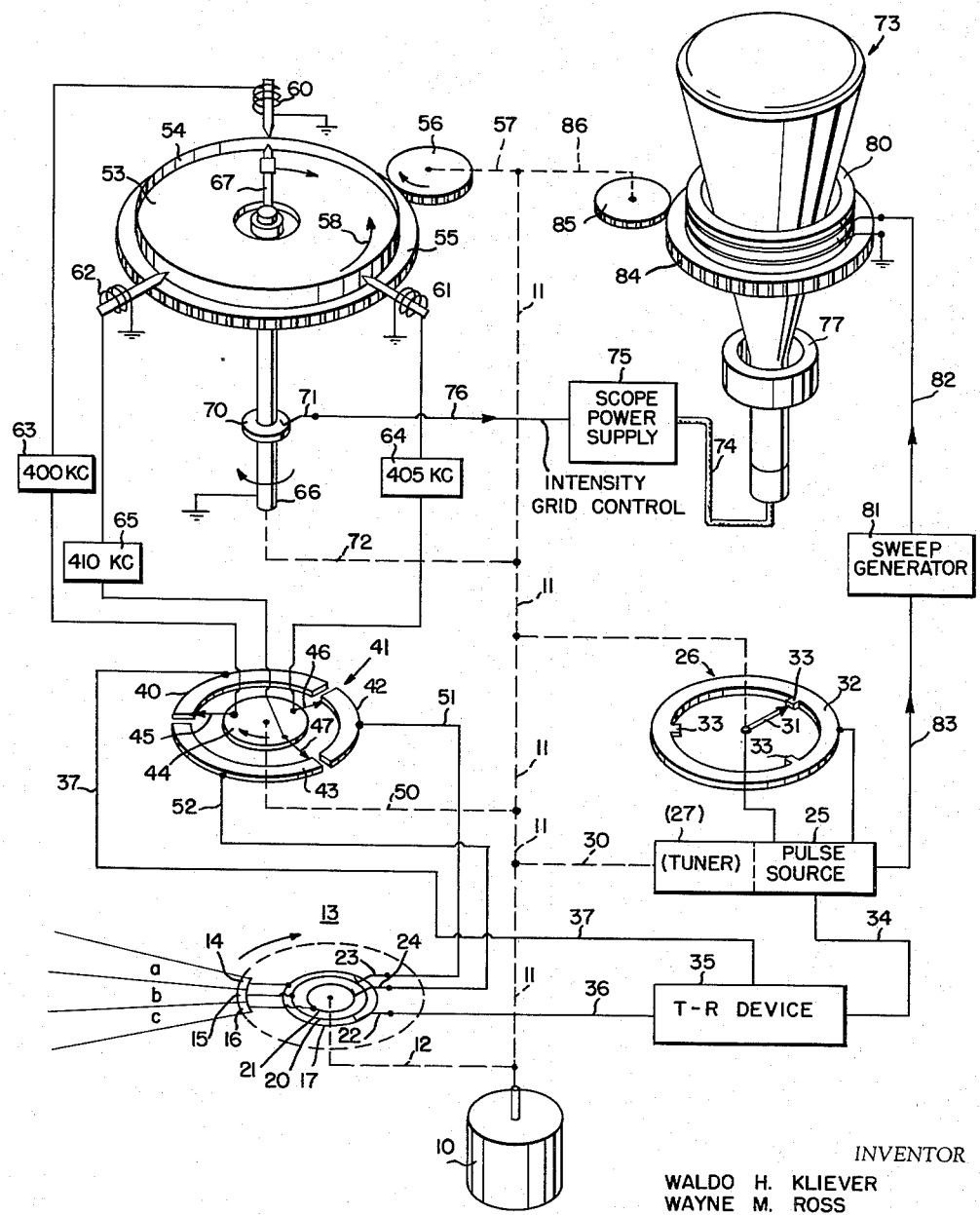
FIGURE 1 is a diagrammatic showing of apparatus making up an operative embodiment of the invention.

At the bottom of FIGURE 1 a scan motor 10 is shown as having a driven shaft 11. Motor 10 runs at a constant speed, and may for convenience by a synchronous AC motor. Driven from shaft 11 through a suitable connection 12 is a transducer head generally indicated at 13. Head 13 comprises a plurality of transducers 14, 15, and 16 mounted for unitary rotation in the direction of the arrow about a normally vertical axis, and arranged so that their beam angles are contiguous, the center lines of the beam angles lying in a common plane normal to the axis of rotation. One terminal of each transducer may be grounded: the ungrounded terminals are connected to slip rings 17, 20, and 21, respectively. Electrical connection to the slip rings is made by brushes 22, 23, and 24, respectively.

The figure also shows a pulse source 25 controlled by a mechanical keyer 26 to give pulses of electrical energy in the ultrasonic frequency range. Source 25 includes a tuner 27 which is driven by motor shaft 11 through a mechanical connection 30. The tuning arrangement is such that for each 3° of rotation of shaft 12 the frequency of the pulse shifts, through a repeating cycle of three values such as 400, 405, and 410 kc. Transducers 14, 15, and 16 are so constructed as to be operative for frequencies throughout this range.

Keyer 26 includes a movable contact 31 and a fixed conducting ring 32 having three contact points 33 engageable by movable contact 31. Members 31 and 32 are connected to source 25, and whenever contacts 31 and 33 engage a pulse is emitted by the source, the frequency of the pulse being determined by tuner 27.

The pulses supplied by source 25 are transmitted along the conductor 34 to a transmit-receive device 35, which is conventional in operation. When a pulse is being transmitted from source 25 the energy passes on through a conductor 36, brush 22 and slip ring 17 to transducer 14, which thereupon emits a pulse of ultrasonic radiation into the water. At all other times device 35 conducts conductor 36 to a conductor 37 connected to one fixed contact 40 of a commutator 41 having two further fixed contacts 42 and 43. Contacts 40, 42 and 43 extend over angles of substantially of 120° about the center, at which there is pivoted a member 44 having three mutually insulated movable contacts 45, 46, and 47 arranged for engagement with the fixed contacts. Member 44 is driven by shaft 11 through a mechanical connection 50 so that it rotates 120° while shaft 12 is rotating through 3°, and the initial adjustment is such that the movable contacts are at the spaces between the fixed contacts each time keyer 26 completes its circuit. Fixed contacts 42 and 43 are connected by conductors 51 and 52 to brushes 23 and 24, respectively. It is understood that conductors 37, 51, and 52 may include amplification apparatus if it is desired to raise the levels of the signals being received.

In the upper left corner of FIGURE 1 there is shown a recorder comprising a disc 53 to the circumference of which is fastened a very thin ribbon 54 of magnetic material wider than the thickness of the disc. Disc 53 is carried by ring gear 55 meshing with a driving pinion 56 connected to shaft 11 by a mechanical connection 57, for rotating in the direction of the arrow 58. Disc 53 rotates 60° while shaft 12 is rotating 3°.

Mounted in fixed position at equal distances around the ribbon 54 are three magnetic recording heads 60, 61, and 62. They are connected to movable contacts 45, 46, and 47 through band pass filters 63, 64, and 65 adjusted to transmit respectively frequencies of 400, 405, and 410 kc., respectively, and to attenuate other frequencies.

Concentric with disc 53 is a rotating shaft 66. Carried by shaft 66 is a magnetic pickup head 67. By this arrangement any signal magnetically recorded by one of the recording heads may be read off in terms of an electrical signal. Shaft 66 carries an insulated collector ring 70 continuously engaged by a brush 71, and is driven by shaft 11 through mechanical connection 72 in a direction opposite to that of disc 53, at twice the speed of the disc. Unit 67 not only reads off the recorded data, but erases the record at the same time: it will be obvious that three separate erasing heads could alternatively be provided, one just clockwise of each recording head.

In the upper right hand part of FIGURE 1, there is shown a cathode ray oscilloscope 73, to which heater and beam power is supplied through a cable 74 from a power supply 75. The signal supplied on pickoff 67 is transmitted through a conductor 76 to an intensity control grid circuit to "unblank" the normally blanked oscilloscope tube and thus give a spot on the screen.

The beam of the tube is formed by a focusing device indicated at 77, and a deflecting coil assembly 80 is shown for displacing the beam from its normally central position. A sweep voltage is supplied by a generator 81 through a conductor 82 to deflect the beam across the screen: generator 81 is triggered by the pulses from source 25 through a conductor 83. Deflecting coil assembly 80 is rotated about the axis of the oscilloscope by a ring gear 84 driven by a pinion 85 and mechanical connection 86 from shaft 11. The speed of gear 84 is the same as that of shaft 12, and it rotates in the same direction in azimuth.

The apparatus operates as follows. Suppose the transducer 14 is at a particular instant oriented so that the center of its directivity pattern is straight ahead of the vessel. At that instant deflecting coil 80 is positioned so as to sweep the electron beam along a radius of the screen arbitrarily selected to indicate "dead-ahead." Pickoff unit 67 has just passed recording unit 60, sliders 45, 46, and 47 have just engaged segments 40, 42, and 43, respectively, and movable contact 31 just engages at one of the contact points 33.

This latter engagement has two effects, the first of which is to trigger sweep generator 81. The deflecting current in coil 80 becomes that which would direct the electron beam at the center of the screen, except that the beam is cut off by a blanking arrangement in power supply 75. The second effect is to supply a pulse on conductor 34: this pulse is of sufficient magnitude to operater T-R device 35, and is accordingly transmitted through conductor 36 to transducer 14. At this time tuner 27 has been set to a frequency of 400 kc., so a brief pulse of 400 kc. compressional wave energy is radiated from transducer 14. As soon as movable contact 31 interrupts the circuit to source 25, the emission of the pulse is interrupted.

The action of sweep generator 81 continues to cause deflecting currents which would move the electron beam outwardly in a direction determined by member 80. Transducer unit 13 rotates in azimuth, disc 53 moves counterclockwise with respect to recording head 60 so that any return pulse picked up by transducer 14 may be recorded thereby, and pickoff 67 moves clockwise. Nothing has been recorded yet so that no signal is supplied on conductor 76. By the time the pulse could have travelled 400 feet and returned, ⅙ second, transducer unit 13 has rotated three degrees clockwise, disc 53 has rotated counterclockwise 60°, pickoff 67 and disc 44 have rotated clockwise 120°, deflecting coil 80 has rotated 3°, tuner 27 has been set to 405 kc., and contact 31 is ready to engage the next contact point 33 on ring contact 32. If during this time an echo pulse returns to transducer 14 the pulse is conducted through slip ring 17, brush 22, conductors 36 and 37, contacts 40 and 45 and filter 63 to recording head 60 which impresses it on the record member 54. The deflection voltage sweep for oscilloscope 73 is completed.

Switch 26 now energizes pulse source 25 again, re-initiating the oscilloscope sweep, and supplying a pulse of 405 kc. energy to transducer 14 which is now directed 3° to starboard. Transducer 15 however is now in the position originally occupied by transducer 14, and is now connected to recording unit 60 through filter 63, so that any echo pulses from this first angular space and from objects between 400 and 800 feet from the vessel are now recorded on the section of record member 54 adjacent that on which are recorded reflections from objects 400 feet or less from the vessel. At the same time transducer 14 is connected to recording unit 61 through filter 64, and any reflections from objects in the nearest third of the second annular space are being recorded at 405 kc.

During this second ⅙-second interval the transducer assembly has rotated clockwise another 3°. Disc 53 has rotated counterclockwise another 60°, and pickup unit 67 has rotated another 120° clockwise, so it has just passed recording head 62 and is at the beginning of the portion of member 54 on which unit 60 has been recording. Deflection coil 80 has rotated another 3°, tuner 27 has been set to 410 kc., and contact 31 again puts pulse source 25 in operation. The oscilloscope sweep is reinitiated and a pulse of 410 kc. energy is supplied to transducer 14 which is now directed 6° to starboard. Transducer 16 however, is now in the position originally occupied by transducer 14, and is connected to recording unit 60 through filter 63, so that any echo pulse in this first angular space and from objects between 800 and 1200 feet from the vessel is now recorded on a third section of record member 54 adjacent to the one last recorded on. During this interval pickup unit 67 sweeps across all three sections of the member on which 400 kc. pulses are recorded, so that at the end of the interval it is in position to read off any pulse as it is recorded.

At the same time transducer 15 is connected through filter 64 to recording unit 61, and any echoes from objects in the second angular space and between 400 and 800 feet from the vessel are being recorded on a section of record member adjacent that on which transducer 15 first recorded. Transducer 14 is simultaneously connected through filter 65 to recording unit 62, and echoes from objects in the angular space now scanned by transducer 14 and less than 400 feet from the vessel are recorded on a further section of recording member 54 at frequency of 410 kc.

In order to illustrate more clearly the operation of the recorder, FIGURES 3 to 9 have been prepared, illustrative of the state of the recorder at intervals of 1/6 second from an initial time $t=0$.

The circumference of the recording medium is divided into six equal sections identified in all six figures by letters A to F. In the center of each figure there is shown the present position of the pickoff unit and the angle through which it has moved in the last time interval. In each case a heavy portion of the circumference of the member indicates that the portion in question has moved past a recording unit and therefore may contain a recorded pulse. Portions of the medium which have been read off and erased during the interval are shown in dotted lines. In certain cases such as FIGURE 6, section A, a portion of the recording medium may be erased and re-recorded in the same interval: this is indicated by using both solid and dotted lines.

The time $t=0$ is that in which the tape has no record, the pickoff unit is in line with recording unit 60 and the disc is aligned with recording unit 60 midway between sections A and F. At this instant a 400 kc. pulse is sent out. The disc now rotates counterclockwise and any signal from transducer 14 is recorded in section A of the record member.

At a time $t=1/6$ a 405 kc. pulse is sent out. The disc continues to rotate and any signal from transducer 14 is recorded in section D, while any signal from transducer 15 is recorded in section B. Pickoff unit 67 is now in alignment with recording unit 62.

At time $t=1/3$ a 410 kc. pulse is sent out. Pickoff unit 67 sweeps section A and erases it, so that there can at once be recorded thereon any echo pulses at 410 kc. supplied by transducer 14. Also read off are the data on section B and that on section C, which was also being put on during this interval from transducer 16. At the same time transducer 15 is recording on section E any 405 kc. echoes which return. The action is repeated as shown in the remaining figures.

In each time interval, half of the recording medium is swept by the pickoff unit, because the latter moves 120° in one direction while the medium moves 60° in the opposite direction. These angles will vary with the number of transducers and recording units used. The following table gives values of disc angle A and pickoff angle B for different numbers $n$ of transducing and recording units.

Table 1

| n | A | B |
| --- | --- | --- |
| 2 | 180 | 180 |
| 3 | 60 | 120 |
| 4 | 30 | 90 |
| 5 | 18 | 72 |
| 6 | 12 | 60 |
| 9 | 5 | 40 |
| 10 | 4 | 36 |

In general the pickoff angle is given by the expression $$\frac{360}{n}$$

and the disc angle by the expression $$\frac{360}{n(n-1)}$$

A study of the drawing will now make it evident that for each 3° rotation of the transducer assembly the relative movement between disc 53 and pickoff unit 67 results in scanning 3 record sections which record all the return pulses from a single frequency. In other words, by recording separately the outputs of three transducers instead of one, recorded at normal time, and then reading the data off at 3 times normal time, it is possible to obtain from pickoff 67 the same quantity of data as would be available from a single transducer scanned at 1/3 the speed. Thus the scanning speed has been tripled without affecting the total range.

It should be emphasized that the system using several transducers and several frequencies permits scanning with high resolution without the transducer having turned out of the range for receiving the more distant reflected signals. This permits faster rotation and a higher repetition rate for information.

While shown in use in search sonar apparatus, the recorder herein is useful for recording any multiplicity of information coming in simultaneously and for reading back at a higher speed than the recording.

Numerous objects and advantages of the invention have been set forth in the foregoing description, together with details of the structure and function of the invention, and the novel features thereof are pointed out in the appended claims. The disclosure however is illustrative only, and changes may be made in detail especially in matters of shape, size and arrangement of parts, within the principle of the invention, to the full extent indicated by the broad general meaning of the terms in which the appended claims are expressed.

We claim as our invention:

1. Apparatus of the class described comprising, in combination: an endless record member; means causing movement of said member in a first direction and at a first rate; a plurality of recording units equally spaced along the path of said member for impressing data thereon; a pickoff unit cooperating with said member to give outputs determined by the recorded data; means moving said pickoff unit in the opposite direction to said member and at twice the speed of said member; an indicator connected to said pickoff unit for actuation in accordance with the outputs thereof; a band pass filter connected to each of said recording units, the pass bands of said filter being different; a set of transducers mounted for unitary rotation and responsive to energy pulses having the frequencies of said filters; and commutator means sequentially connecting said transducers to said filters in a repeating sequence.

2. Apparatus of the class described comprising, in combination: a circular record member; means causing rotation of said member about its center in a first direction and at a first rate; a plurality of recording units equally spaced about said member for impressing data thereon; a pickoff unit to give outputs determined by the recorded data on said member; means mounting said pickoff unit for rotation about said center in the opposite direction to said member and at a multiple of the speed of said member; an indicator connected to said pickoff unit for actuation in accordance with the outputs thereof; a band pass filter connected to each of said succeeding recording units, the pass bands of said filters being different; a set of transducers mounted for unitary rotation and responsive to energy pulses having the frequencies of said filters; and commutator means sequentially connecting said transducers to said filters in a repeating sequence.

3. The apparatus of claim 1, and means sequentially energizing one of said transducers with pulses of alternating voltage of three different frequencies corresponding to the frequencies of said filters, the pulse repetition rate being equal to the commutation rate of said commutator.

4. Apparatus of the class described comprising, in combination: a circular recording member; a plurality of recording units equidistantly mounted around said member for recording data thereon; a pickoff unit mounted for reading data from said recording member; means for causing rotation of said member about the center thereof in a first direction at such a speed that in a unit of time it rotates through an angle $$\frac{360}{n}$$

and means for causing rotation of said pickoff unit about said center in the opposite direction, at such a speed that in said unit of time it rotates through an angle $$\frac{360}{n(n-1)}$$

where $n$ is the number of recording units making up said plurality.

5. Apparatus of the class described comprising, in combination: a circular recording member; a plurality of recording units equidistantly mounted around said member for recording data thereon; a pickoff unit mounted for reading data from said record; means for causing rotation of said member about the center thereof in a first direction, at such a speed that in a unit of time it rotates through an angle $$\frac{360}{n}$$

means for causing rotation of said pickoff unit about said center in the opposite direction, at such a speed that in said unit of time it rotates through an angle $$\frac{360}{n(n-1)}$$

where $n$ is the number of recording units making up said plurality; a cathode ray oscilloscope including means directing a beam of electrons toward a fluorescent screen and means controlling said beam; means causing said beam to sweep repeatedly across said screen, the interval occupied by said sweep being said unit of time; means supplying the output of said pickoff unit to said beam controlling means; a plurality of transducers equal in number to the number of said recording units and each having an effective beam angle of $\theta$ degrees; means mounting said transducers, in effective side by side relation, for rotation about a common axis at such said rate that in a unit of time they rotate through an angle $$\frac{360n}{\theta}$$

and means including a commutating means interconnecting said transducers and said recorders in predetermined sequence, the commutation taking place once in each unit of time.

6. The apparatus of claim 5, and means actuated once in each unit of time to energize a first of said transducers with a short pulse of electrical energy of a frequency which has one of $n$ cyclically repeating values, said interconnecting means including a filter connected to each recorder for rejecting signals not of a single frequency, said pulse, said commutation, and the beginning of said sweep occurring simultaneously.

7. In a search system, in combination: a plurality of transducers giving outputs in accordance with received energy pulses of a like plurality of frequencies; means unitarily mounting said transducers for successively sweeping through an angular space in successive equal units of time; frequency selective means simultaneously recording the outputs of said transducers on separate sections of a medium as they occur; and pickoff means sequentially reading off the data recorded on all said separate sections in an interval equal to the quotient of one of said units of time divided by the number of said transducers.

8. Apparatus according to claim 7 together with a cathode ray oscilloscope; means sweeping the beam of said oscilloscope across the screen thereof during each said interval, and means connecting said pickoff means to an electrode of said oscilloscope to modify the beam.

9. In a search sonar system, in combination: a plurality of transducers having equal effective beam angles; means unitarily mounting said transducers with their beam angles contiguous, for rotation about an axis at a selected speed; means energizing one of said transducers with a pulse of alternating voltage at predetermined successive intervals, said voltage pulses having a repeating set of different frequencies equal in number to the number of said transducers; a recording medium moving in a first direction at a rate determined by said selected speed; a plurality of recording units mounted adjacent said medium for recording thereon; a plurality of filters connected to said recording units and passing voltages having the frequencies of said set; commutation means interconnecting said transducers and said filters, the commutation rate being determined by said selected speed; a pickoff unit mounted for movement adjacent said medium in a direction opposite thereto and at a speed which is a multiple of the speed of said medium; and an indicator energized with the output of said pickoff unit.

References Cited in the file of this patent
UNITED STATES PATENTS

| | | |
|---|---|---|
| 2,006,961 | Moore | July 7, 1935 |
| 2,170,751 | Gabrilovitch | Aug. 22, 1939 |
| 2,430,283 | Epstein | Nov. 4, 1947 |
| 2,453,502 | Dimmick | Nov. 9, 1948 |
| 2,816,157 | Andreas et al. | Dec. 10, 1957 |
| 2,822,536 | Sandretto | Feb. 4, 1958 |